Sept. 15, 1925.
W. S. BROWN
1,553,503
SUSPENSION BEARING FOR SCALES
Filed Oct. 8, 1923
2 Sheets-Sheet 1
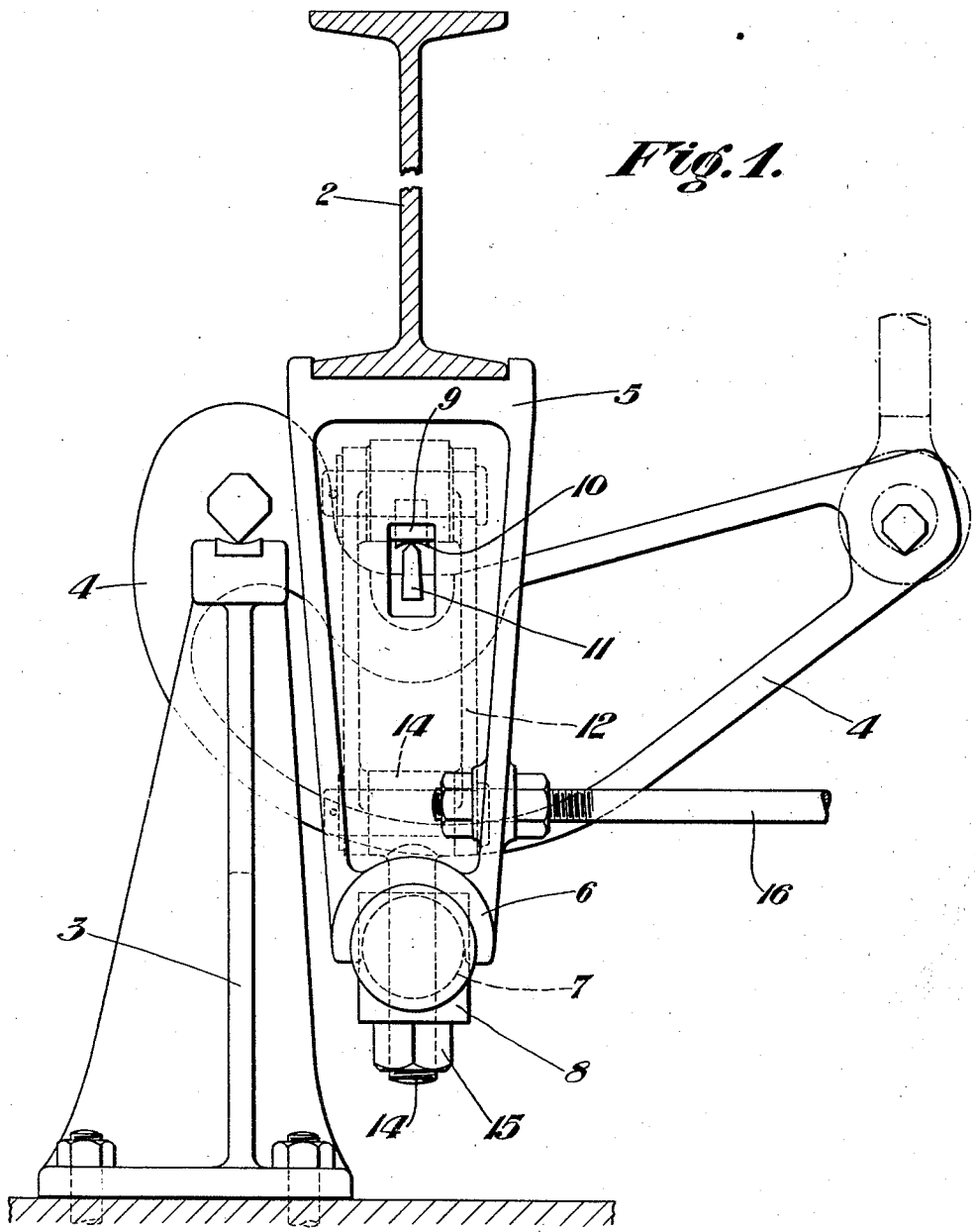
Witnesses:
Edwin Trueb
Inventor:
WALTER S. BROWN,
by D. Anthony Usina
his Attorney.

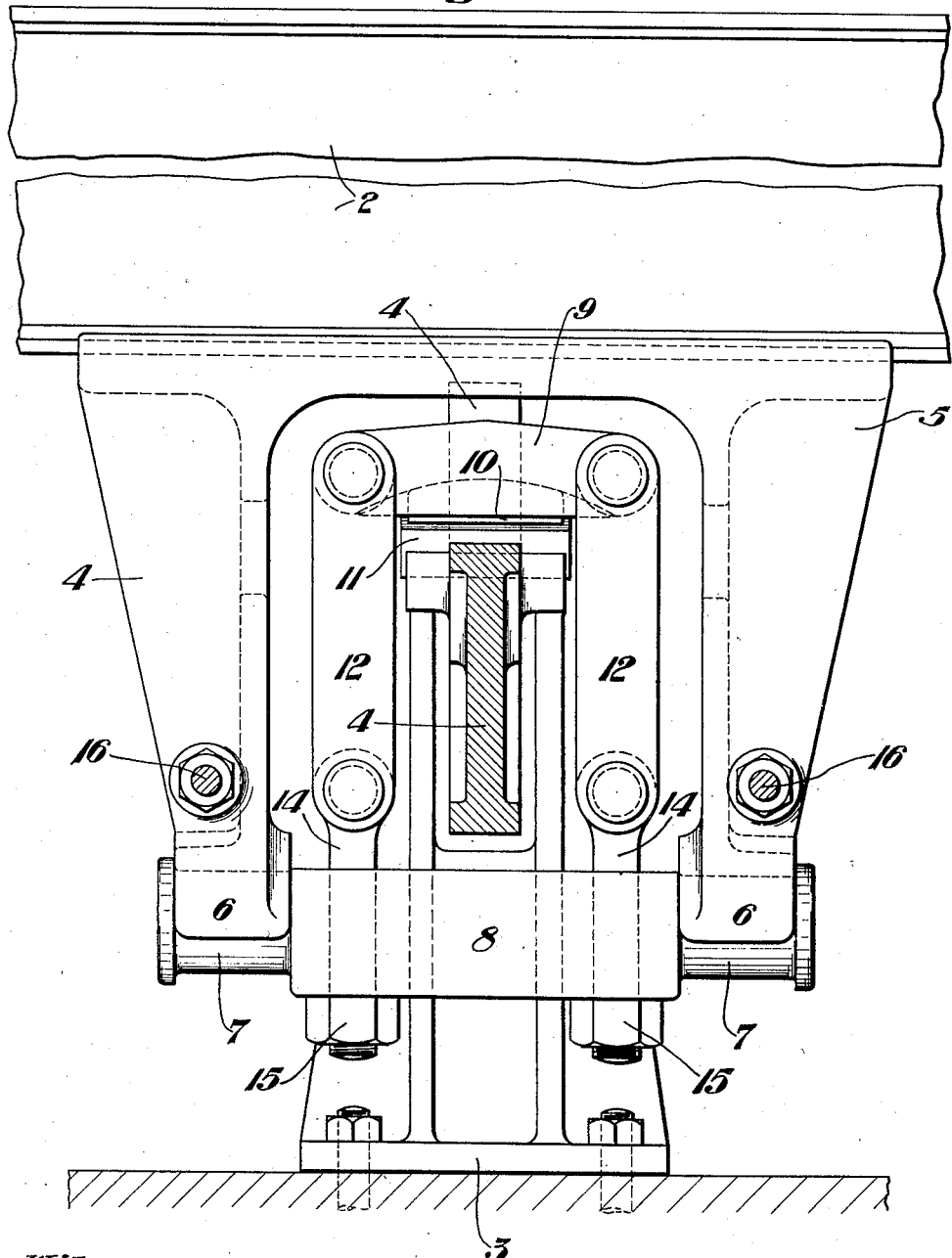

Patented Sept. 15, 1925.

1,553,503

UNITED STATES PATENT OFFICE.

WALTER S. BROWN, OF AMBRIDGE, PENNSYLVANIA.

SUSPENSION BEARING FOR SCALES.

Application filed October 8, 1923. Serial No. 667,271.

*To all whom it may concern:*

Be it known that I, WALTER S. BROWN, a citizen of the United States, and resident of Ambridge, in the county of Beaver and State of Pennsylvania, have invented certain new and useful Improvements in Suspension Bearings for Scales, of which the following is a specification.

This invention relates to platform scales and more particularly to suspension bearings for such scales, and has for one of its objects the provision of an improved form of bearing which will permit the platform to move freely, transversely and longitudinally, when the load is being positioned on the scale, thus materially reducing wear on the fulcrum parts of the scale.

Another object is to provide a scale bearing which may be adjusted vertically to level the scale platform.

A still further object is to provide a scale bearing having the novel construction, design, and combination of parts hereinafter described and illustrated in the accompanying drawings. In the drawings, Figure 1 is a front elevation of a scale bearing constructed in accordance with my invention.

Figure 2 is a side elevation of the bearing.

In the ordinary platform scale there are a plurality of main levers with bearings complete, main lever stands, links, etc. In describing one main lever, bearing and component parts, we describe all of them, since they are duplicates, and, therefore, only one main lever, bearing and component parts are illustrated and described.

Referring more particularly to the drawing, the numeral 2 designates a platform beam of the scale platform, 3 the main lever stand, and 4 the main lever, which is fulcrumed on the main lever stand 3.

An inverted U-shaped bearing bracket 5, is secured on the scale beam 2 with its legs extending downwardly. The lower or free ends of the legs of the bearing bracket 5 are provided with concave bearing portions 6 which engage with the cylindrical bearing surfaces 7 of the supporting shaft 8.

A saddle block 9 having a bearing steel 10 mounted in its lower face is fulcrumed on the knife edge steel 11 in the upper face of the main lever 4. A pair of links 12 have their upper ends pivotally secured to the ends of the saddle block 9 and their lower ends pivotally connected to eyebolts 14.

The eye bolts 14 pass through suitable apertures in the shaft 8 and are secured in position by nuts 15. The nuts 15 may be moved along the bolts in order to vertically adjust the shaft 8.

With a bearing constructed as described above, when a load is moved onto the scale platform, the platform is free to move transversely, since the bearing bracket can rock freely in a transverse direction on the shaft 8, and the platform is also free to move longitudinally, due to the flexible connection between the saddle block 9 and shaft 8 formed by links 12 and eye bolts 14.

It will be understood that the bearings, main levers, etc., are generally arranged in pairs at opposite sides of the scale and, therefore, a suitable tie rod 16 is provided to tie the bearing bracket stands at opposite sides of the scale together.

I claim:—

1. A suspension bearing for platform scales, comprising in combination with a main lever stand and main lever fulcrumed thereon, of a substantially inverted U-shaped bearing bracket adapted to be secured to the scale platform, a single saddle block fulcrumed on said main lever, a supporting shaft in engagement with the lower ends of each leg of said inverted U-shaped bearing bracket, and means for flexibly suspending said shaft from each end of said saddle block.

2. A suspension bearing for platform scales, comprising in combination with a main lever stand and main lever fulcrumed thereon, of a substantially inverted U-shaped bearing bracket adapted to be secured to the scale platform, said bearing bracket having the free ends of its legs terminating in concave bearings, a single saddle block fulcrumed on said main lever, a supporting shaft having cylindrical bearing portions at each end in engagement with the bearings formed on the free ends of the legs of said bearing bracket, and means for flexibly suspending said shaft from each end of said saddle block.

3. A suspension bearing for platform scales, comprising in combination with a main lever stand and main lever fulcrumed thereon, of a substantially inverted U- shaped bearing bracket adapted to be secured to the scale platform, said bearing bracket having the free ends of its legs terminating in concave bearings, a saddle block fulcrumed on said main lever, a supporting shaft having cylindrical bearing portions at each end in engagement with the bearings formed on the free ends of the legs of said bearing bracket, and means for flexibly suspending said shaft from said saddle block, said last named means being vertically adjustable to raise and lower said shaft.

4. In a platform scale the combination of a main lever stand, a main lever fulcrumed on said stand, a substantially inverted U-shaped bearing bracket secured to said scale and having one leg extending downwardly on each side of said main lever, said bearing bracket having the free lower ends of its legs terminating in bearing surfaces, a bearing shaft in engagement with said bearing surfaces and adapted to permit transverse horizontal movement of said scale, a single saddle block fulcrumed on said main lever, and means for flexibly suspending said shaft from the opposite ends of said saddle block.

5. In a platform scale the combination of a main lever stand, a main lever fulcrumed on said stand, a substantially inverted U-shaped bearing bracket secured to said scale and having one leg extending downwardly on each side of said main lever, a single saddle block fulcrumed on said lever, said bearing bracket having the free lower ends of its legs terminating in bearing surfaces, a bearing shaft in engagement with said bearing surfaces and adapted to permit transverse horizontal movement of said scale, means for suspending said shaft from said saddle block, said means including links for permitting longitudinal movement of said scale, and means for vertically adjusting said shaft relative to said bearing bracket.

6. In a platform scale the combination of a main lever stand, a main lever fulcrumed on said stand, a substantially inverted U-shaped bearing bracket secured to said scale and having one leg extending downwardly on each side of said main lever, a saddle block fulcrumed on said lever, said bearing bracket having the free lower ends of its legs terminating in bearing surfaces, a bearing shaft in engagement with said bearing surfaces and adapted to permit transverse horizontal movement of said scale, a saddle block fulcrumed on said main lever, links pivotally secured to each end of said saddle block, and eye bolts adjustably secured to said shaft and pivotally secured to the lower ends of said links, whereby said shaft is secured in position and longitudinal movement of said scale is permitted.

7. A suspension bearing for platform scales, comprising in combination with a main lever stand and main lever fulcrumed thereon, of a substantially inverted U-shaped bearing bracket adapted to be secured to the scale platform, a saddle block fulcrumed on said main lever, a supporting shaft in engagement with the lower ends of each leg of said inverted U-shaped bearing bracket, links pivotally secured to each end of said saddle block, and eye bolts adjustably secured to said shaft and pivotally secured to the lower ends of said links, whereby said shaft is secured in position and longitudinal movement of said scale is permitted.

In testimony whereof I have hereunto signed my name.

WALTER S. BROWN.